US009501502B2

(12) United States Patent
Lee et al.

(10) Patent No.: US 9,501,502 B2
(45) Date of Patent: Nov. 22, 2016

(54) LOCKING PROTOCOL FOR PARTITIONED AND DISTRIBUTED TABLES

(71) Applicants: Juchang Lee, Seoul (KR); Jin Yeon Lee, Seoul (KR); Yongjae Chuh, Seoul (KR); Jaeyun Noh, Seoul (KR)

(72) Inventors: Juchang Lee, Seoul (KR); Jin Yeon Lee, Seoul (KR); Yongjae Chuh, Seoul (KR); Jaeyun Noh, Seoul (KR)

(73) Assignee: SAP AG, Walldorf (DE)

( * ) Notice: Subject to any disclaimer, the term of this patent is extended or adjusted under 35 U.S.C. 154(b) by 817 days.

(21) Appl. No.: 13/750,194

(22) Filed: Jan. 25, 2013

(65) Prior Publication Data

US 2014/0156619 A1 Jun. 5, 2014

Related U.S. Application Data

(60) Provisional application No. 61/731,631, filed on Nov. 30, 2012.

(51) Int. Cl.
*G06F 17/30* (2006.01)

(52) U.S. Cl.
CPC ... *G06F 17/30289* (2013.01); *G06F 17/30008* (2013.01); *G06F 17/30362* (2013.01)

(58) Field of Classification Search
None
See application file for complete search history.

(56) References Cited

U.S. PATENT DOCUMENTS

2009/0037416 A1* 2/2009 Raghavan ......... G06F 17/30362
2012/0310881 A1* 12/2012 Shadmon .......... G06F 17/30578 707/613

OTHER PUBLICATIONS

Ray, Indrajit, et al. "An advanced commit protocol for MLS distributed database systems." Proceedings of the 3rd ACM conference on Computer and communications security. ACM, 1996.*
Thomson, Alexander, et al. "Calvin: fast distributed transactions for partitioned database systems." Proceedings of the 2012 ACM SIGMOD International Conference on Management of Data. ACM, 2012.*

* cited by examiner

*Primary Examiner* — Nan Hutton
(74) *Attorney, Agent, or Firm* — Sterne, Kessler, Goldstein & Fox P.L.L.C.

(57) ABSTRACT

Systems, methods and computer program product embodiments for providing a locking protocol for partitioned and distributed database tables are disclosed herein. A locking method includes executing, by at least one processor, a first database transaction on a second node, attempting to acquire and acquiring a lock on the second node in intentional exclusive mode, executing, by the at least one processor, a second database transaction on a first node, acquiring a lock on the first node in exclusive mode and waiting to acquire a lock on the second node in exclusive mode, routing, by the at least one processor, the first database transaction to the first node and unsuccessfully trying to acquire a lock on the first node and committing, by the at least one processor, the first database transaction.

20 Claims, 10 Drawing Sheets

400

```
Optimistic IX Locking Protocol
{                                   402
transaction (IX try_lock on local node);
If (!try_lock) {                    404
        if (acquired IX lock on remote nodes) {
        skip locking; 406
        // Do not need to lock local node as transaction has already acquired IX lock
        }
        else {
        // No lock exists           408
        acquire local IX lock;
        wait if necessary;
        }
}
```

FIG. 4A

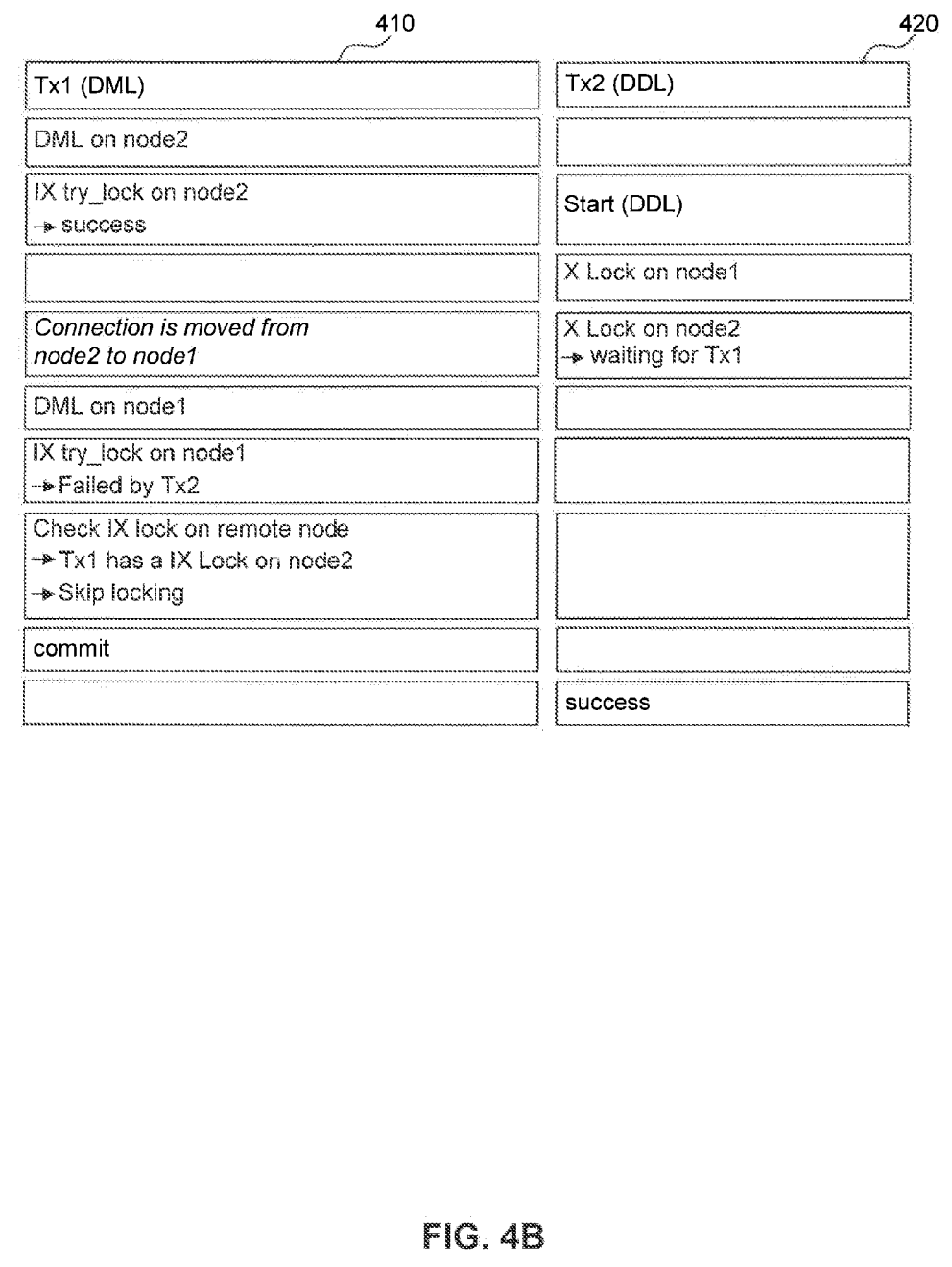

| 410 | 420 |
| --- | --- |
| Tx1 (DML) | Tx2 (DDL) |
| DML on node2 | |
| IX try_lock on node2<br>→ success | Start (DDL) |
| | X Lock on node1 |
| *Connection is moved from node2 to node1* | X Lock on node2<br>→ waiting for Tx1 |
| DML on node1 | |
| IX try_lock on node1<br>→ Failed by Tx2 | |
| Check IX lock on remote node<br>→ Tx1 has a IX Lock on node2<br>→ Skip locking | |
| commit | |
| | success |

FIG. 4B

LOCKING PROTOCOL FOR PARTITIONED AND DISTRIBUTED TABLES

CROSS-REFERENCE TO RELATED APPLICATION

This application claims the benefit of U.S. Provisional Application No. 61/731,631, "Locking Protocol for Partitioned and Distributed Tables," filed Nov. 30, 2012, incorporated by reference herein.

BACKGROUND

Field

The present embodiments are generally related to a locking protocol for partitioned and distributed database tables.

Background

Conventional database management systems have been optimized to perform on hardware with limited main memory, e.g. random access memory (RAM). These conventional database management systems have slower disk input/output (I/O) that serves as a bottleneck.

However, computer architecture has advanced so that multi-core parallel processing is possible by processor cores communicating using RAM or a shared cache. In addition, RAM is no longer as limited a resource. Databases may now be stored entirely in RAM and thus disk access is no longer a limiting factor for performance. However, multi-core systems present other challenges.

Databases of online transaction processing systems have been modified to utilize multi-core parallel processor computer systems efficiently. In particular, these databases support parallel execution of transactions, are now located in-memory and are organized to be cache efficient. In addition, the databases support partitioning over a plurality of nodes. Conventionally, there was a single lock manager used for an entire partitioned database table. Maintaining this single lock manager provides challenges such as deadlock and extra network costs as well as overhead resulting from a master database node. However, conventional locking protocols may be improved to mitigate deadlock and overhead.

BRIEF SUMMARY

Briefly stated, the example embodiments include system, method and computer program product embodiments, and combinations and sub-combinations thereof, for providing a locking protocol for partitioned and distributed database tables. According to embodiments, multi-core parallel processing in-memory partitioned database systems may execute an optimistic intentional exclusive locking protocol.

In an embodiment, a method includes executing, by at least one processor, a first database transaction on a second node, attempting to acquire and acquiring a lock on the second node in intentional exclusive mode. The method further includes executing, by the at least one processor, a second database transaction on a first node, acquiring a lock on the first node in exclusive mode and waiting to acquire a lock on the second node in exclusive mode. In addition, the method includes routing, by the at least one processor, the first database transaction to the first node and unsuccessfully trying to acquire a lock on the first node. The first database transaction is then committed by the at least one processor.

In a further embodiment, a method includes attempting, by at least one processor, an intentional exclusive lock for a local database node having a partition of a database table. The method further includes determining, by the at least one processor, that the trying failed and determining whether a remote database node having another partition of the database table has acquired an intentional exclusive lock and acquiring the intentional exclusive lock for the another portion of the database table if not acquired.

Further features and advantages, as well as the structure and operation of various embodiments thereof, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate exemplary embodiments and, together with the description, further serve to explain the principles of the disclosure and to enable a person skilled in the relevant art(s) to make and use the contemplated and disclosed embodiments.

FIG. 4A illustrates a method based on an optimistic IX locking protocol according to example embodiments.

FIG. 4B illustrates the optimistic IX locking protocol according to example embodiments.

Figure 1:
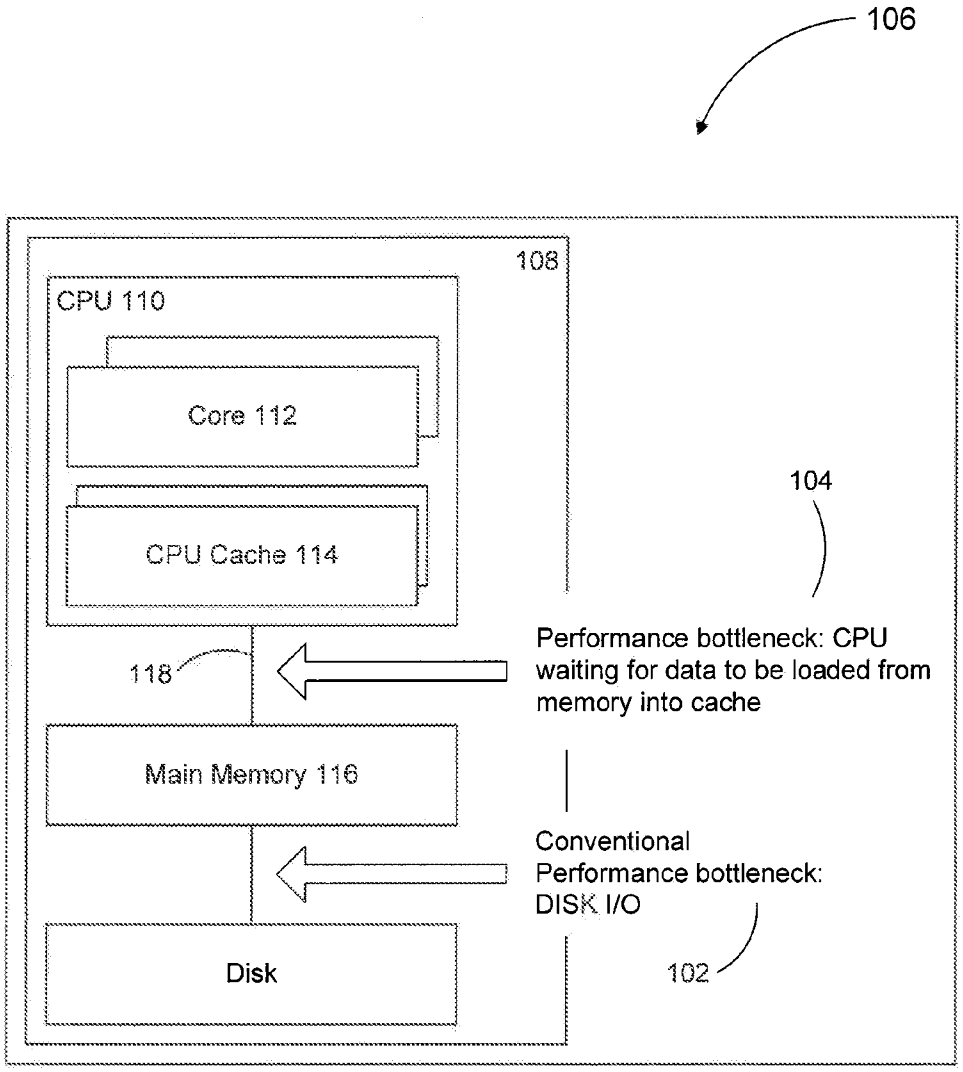
FIG. 1 illustrates a block diagram of database system hardware architecture according to example embodiments.

Features and advantages of embodiments of the present disclosure will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Introduction

The following detailed description refers to the accompanying drawings that illustrate exemplary embodiments consistent with this disclosure. Other embodiments are possible, and modifications can be made to the embodiments within the spirit and scope of the embodiments. Therefore, the detailed description is not meant to limit the embodiments. Rather, the scope of the embodiments is defined by the appended claims.

Example Hardware Architecture

FIG. 1 shows a block diagram of a database system 106 according to example embodiments. The database system may be, but is not limited to, an in-memory column-store database system.

In conventional database systems, the focus is directed to optimizing disk access, by minimizing a number of disk pages to be read into main memory when processing a query. This bottleneck is shown in FIG. 1 at 102.

However, the performance bottleneck in multi-core parallel processor computer systems is found between a CPU cache and RAM. The processor cores wait for data to be loaded from RAM into the processor cache. This bottleneck is shown in FIG. 1 at 104. This bottleneck is addressed by making efficient usage of the CPU cache. As a number of processor cores increase, CPUs will continue to be able to simultaneously process increasingly more data.

As shown in FIG. 1, database system 106 may include a computer 108 having at least one processor (CPU) 110. As an example, the database system 106 in FIG. 1 is shown having one processor, but the database system is not limited to having one processor and may have two or more processors. As an example, CPU 110 in FIG. 1 is shown as having two cores 112, but the processor 110 may include less than two cores or more than two cores. The cores 112 may have a CPU cache 114 that is shared among the cores. Each core 112 may have a plurality of hardware contexts, e.g. threads. In addition, the computer 108 includes random-access memory (RAM) 116 which may include hundreds of GB or TBs of RAM. According to example embodiments, the database system 106 may be an in-memory column-store database system stored and executed within RAM 116. Thus, as opposed to conventional database systems stored on disk where disk access and speed presents a bottleneck, the RAM 116 of an in-memory database system presents a bottleneck for the faster cache 114. The RAM 116 and processor 110 may communicate via a bus 118.

Transactions

According to example embodiments, the database system 106 may execute transactions. A transaction is a logical unit of work that includes one or more SQL statements. A transaction may begin with a first executable statement being DML (data manipulation language) used for inserting, updating, deleting or replacing (upserting) data into partitioned database tables or DDL (data definition language) used for defining partitioned database tables such as creating or dropping a table. In addition, a transaction ends with one of the following events: a COMMIT or ROLLBACK statement issues, a DDL statement executes (e.g. automatic commit) or an error occurs (e.g. a lock timeout error or a deadlock error).

According to example embodiments, transactions executed are provided full ACID support (atomicity, consistency, isolation and durability). In addition, according to example embodiments, the database provides multi-version concurrency control (MVCC) with statement-level and transaction-level isolation as well as multi-level locking and deadlock detection. Regarding statement-snapshot isolation, a statement may see changes that are committed before a statement is started. This is a default isolation level and is also known as read-committed. Regarding transaction-snapshot isolation, a statement may see changes committed before its transaction is started. This is known as repeatable-read or serializable.

Locking

According to example embodiments, the database system 106 may serialize access to shared resources that may change. Serialization may be provided by locks. A lock may be acquired right before changes are made to a database and released at transaction commit or transaction rollback. According to example embodiments, there are three types of transaction locks: a DB lock, e.g. a meta lock, a Table Lock, e.g. an object lock and a record lock. The DB lock may include a shared mode (S) and an exclusive mode (X). The Table Lock may include intentional exclusive (IX) and exclusive (X) modes. The record lock may include exclusive (X) mode. The example embodiments described below are related to Table Locks, but the embodiments are not limited to Table Locks.

An exclusive lock may be acquired by a Lock Table command explicitly or by a DDL command implicitly. However, a transaction that holds an exclusive lock is the only transaction that may access the table. Lock requests for the table by other transactions are blocked while the exclusive lock is held.

Intentional exclusive locks may be acquired by DML implicitly. Multiple transactions may acquire an intentional exclusive lock. Exclusive lock requests for the table by other transactions are blocked while the intentional exclusive lock is held.

According to example embodiments, a lock wait timeout may occur. A lock wait timeout occurs when a commit/rollback is missing, when an update transaction takes a long time to process or a lock wait timeout configuration value is very small. In addition, deadlocks may occur and may be automatically detected. Deadlocks may be resolved by rolling back a database transaction that is involved in the deadlock. However, according to example embodiments, deadlocks may be mitigated.

Partitioned Tables

Figure 2:
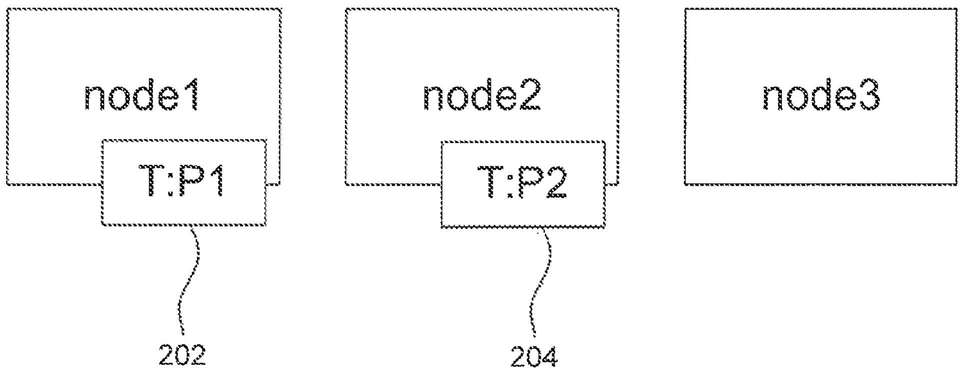
FIG. 2 illustrates a partitioned database according to example embodiments.

According to example embodiments, database tables may be partitioned into multiple partitions as shown in FIG. 2. In particular, a database may be divided or partitioned into independent parts and may be distributed. Thus, each database may be spread amongst a plurality of partitions or nodes and transactions may be performed in parallel on the partitions. FIG. 2 shows partition P1 202 and partition P2 204. P1 202 is associated with node1 and P2 204 is associated with node2. As shown in FIG. 2, there is not a partition associated with node3, but this is merely an example, and a partition may be associated with node3.

Deadlock in Partitioned Database

Conventionally, for DML transactions a shared lock is acquired for each partition of a database table. When DDL transactions occur simultaneously, deadlock situations may occur.

Figure 3:
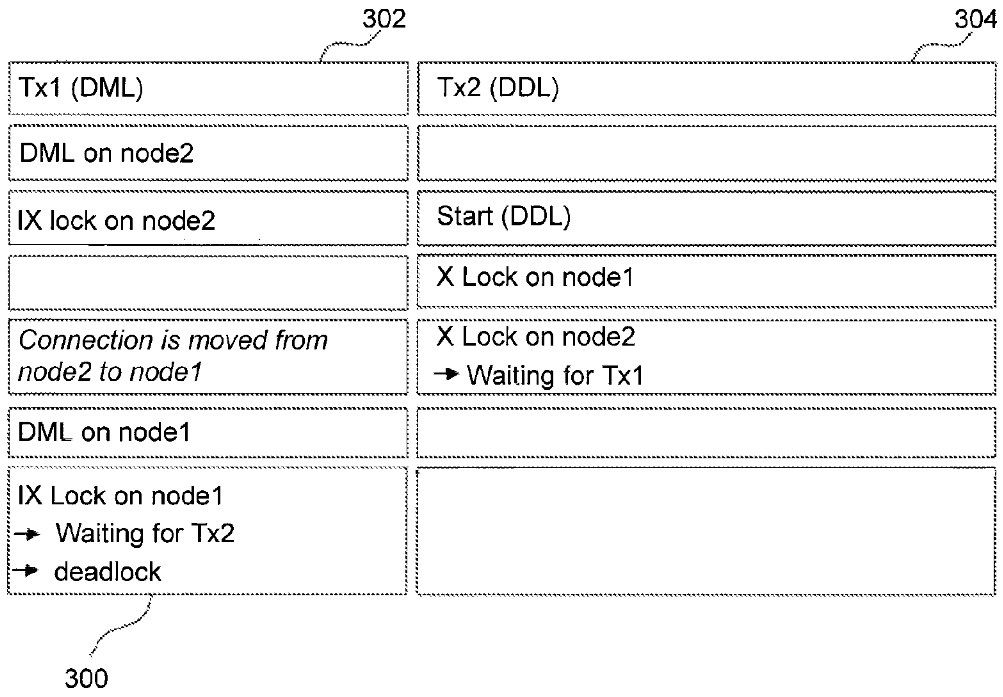
FIG. 3 illustrates an example instance of deadlock between DDL and DML transactions.

FIG. 3 illustrates deadlock in a partitioned database between DDL and DML transactions. Conventionally, for DDL an X (exclusive) lock was used to lock a master node and all nodes containing the partitions. An X lock may acquire multiple locks on multiple nodes.

However, according to example embodiments, a single database transaction may move around to multiple connections on multiple nodes using statement routing. Thus, if a DML single transaction also acquires an IX lock on multiple nodes, deadlock may occur between DDL and DML operations.

In other words, this conventional method of locking causes deadlock 300 between DDL and DML transactions. As an example, a first transaction Tx1 302 may be DML and a second transaction Tx2 304 may be DDL. Tx1 302 may begin first as DML on node2. An IX lock may be applied to node2. Next, Tx2 304 may begin DDL. An X lock may be applied to node1. Tx2 304 attempts to apply an X lock on node2, but is forced to wait for Tx1 302. Next, Tx1 302 performs DML on node1 and applies an IX lock on node1 and waits for Tx2 304. At this point, there is deadlock because Tx1 302 has acquired multiple locks on multiple partitions of the same database. Acquisition of IX locks on multiple nodes is avoided according to the embodiments described below.

According to embodiments, each node has its own local lock server and there is not a centralized global lock server. Deadlock problems may be solved according to the example embodiments below.

Optimistic IX Locking Protocol

According to example embodiments, deadlock may be avoided between an IX lock used for DML in a first transaction and an X lock used tor DDL in a second transaction. Rather than a single lock manager, each node may maintain its own lock manager.

As shown in FIG. 4A, an optimistic IX locking protocol 400 is shown as pseudocode. First, IX try_lock is performed by a transaction in step 402 before any locking occurs. If try_lock is successful by the transaction, then a local node is locked in an IX mode.

If try_lock fails, then it is determined whether the transaction has already acquired an IX lock on any of the remote nodes in step 404.

If the transaction has acquired a lock on one of the remote nodes, then locking of the local node is skipped in step 406.

However, if no other remote lock exists, then the transaction may wait on the local node in step 408 and the transaction may wait to acquire the local node in IX mode without deadlock occurring.

In a first embodiment shown in FIG. 4B, a first transaction Tx1 410 performs DML and a second transaction Tx2 420 performs DDL. As shown, DML is performed by Tx1 410 on node2. Next, Tx1 410 may perform IX try_lock on node2, which is successful, e.g. Tx1 will acquire the lock in IX mode. Simultaneously, DDL is performed by Tx2 420. An X lock is acquired by Tx2 420 and node1 is locked. Tx2 420 will acquire and apply an X lock to node2, but will wait for Tx1 410. A database connection is moved from node2 to node1 by Tx1 410. Next, DML is performed by Tx1 410 on node1. Tx1 410 will perform IX try_lock on node1, which will fail because Tx2 420 holds an X lock on node 1. Tx1 410 will then check for an IX lock on a remote node. Tx1 410 has an IX lock on node2, and will skip locking. Tx1 410 will then commit and Tx2 420 is successful. Thus, there is no deadlock. In other words, DML transactions may only lock a single partition/node of a database at a time, thereby mitigating deadlock.

Figure 5:
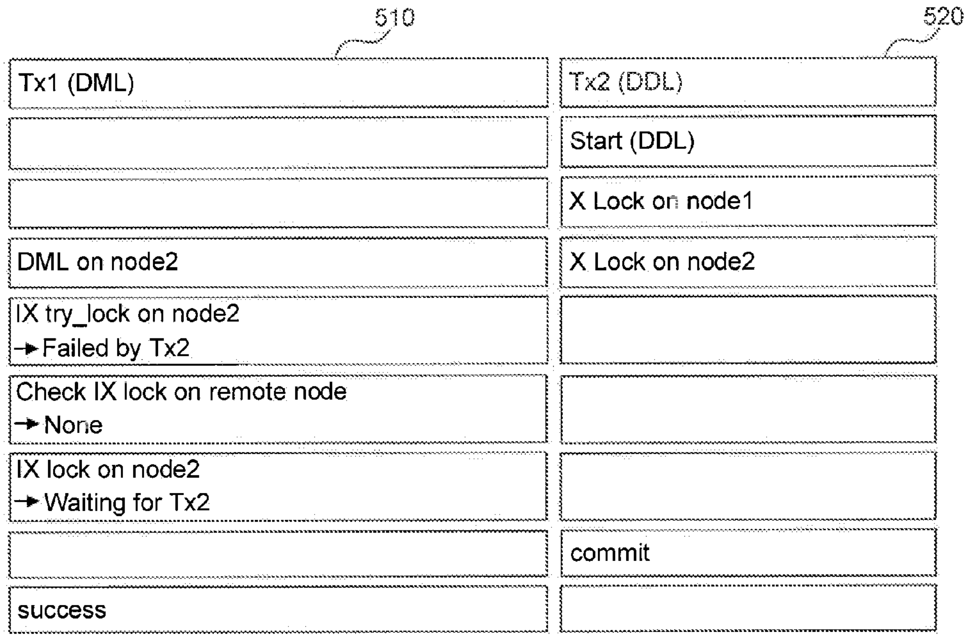
FIG. 5 illustrates a further embodiment involving the optimistic IX locking protocol according to example embodiments.

In an additional embodiment shown in FIG. 5, a first transaction Tx1 510 performs DML and a second transaction Tx2 520 performs DDL. As shown, DDL is performed by Tx2 520. An X lock is applied to node1 and then an X lock is applied to node2. Next, Tx1 510 may perform DML on node2. Tx1 510 will perform IX try_lock on node2, but this will fail because Tx2 520 holds an X lock on node2. Next, Tx1 510 will check whether there is an IX lock on a remote node. Tx1 510 will determine that there are no other IX locks on remote nodes. Tx1 510 will then wait for Tx2 520 to complete. Tx2 520 will commit and then Tx1 510 may continue. Thus, the scenario shown in FIG. 5 is successful and no deadlock occurs.

Figure 6:
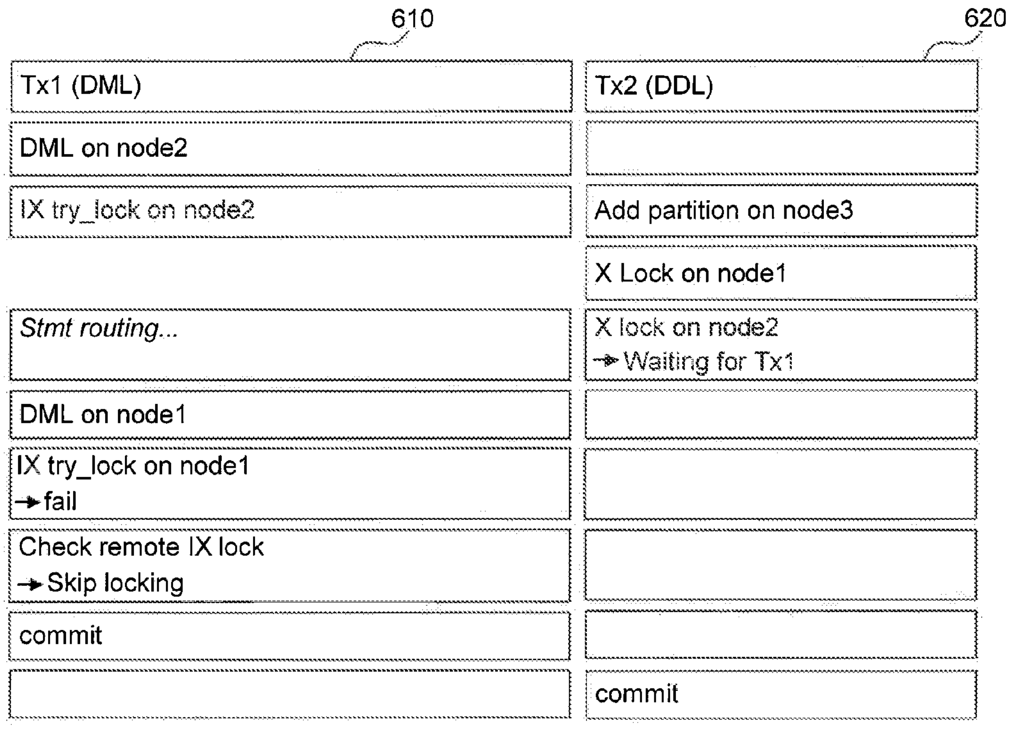
FIG. 6 illustrates an even further embodiment involving the optimistic IX locking protocol according to example embodiments.

In a further embodiment shown in FIG. 6, a first transaction Tx1 610 performs DML and a second transaction Tx2 620 performs DDL. As shown, DML is performed by Tx1 610 on node2. Next, Tx1 610 may perform IX try_lock on node2, which is successful. Tx1 610 will lock node2 in IX mode. Simultaneously, Tx2 620 may add a partition on node3. Next, Tx2 620 will apply an X lock to node1, and then attempt to apply an X lock to node2. However, Tx2 620 will have to wait for Tx1 610. Tx1 610 will perform statement routing and apply DML to node1. Tx1 610 will perform IX try_lock to node1, but this will fail. Tx1 610 will then try to check remote IX locks. Tx1 610 will see that there is an IX lock on node2 and will skip locking node1. Thus, Tx1 610 will then commit. Tx2 620 will be able to commit and deadlocks may be avoided.

Figure 7:
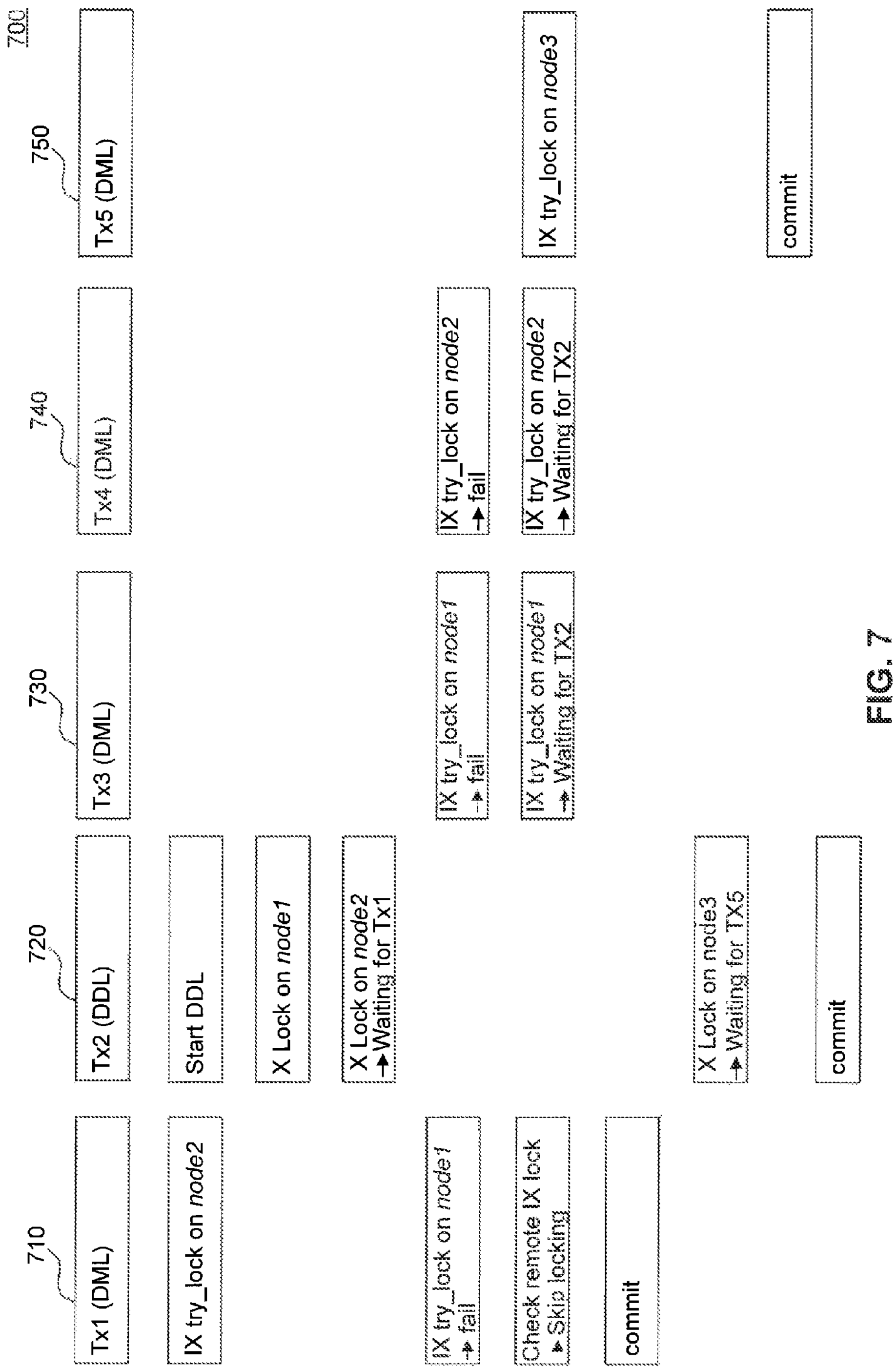
FIG. 7 illustrates an additional embodiment involving the optimistic IX locking protocol according to example embodiments.

In an even further embodiment shown in FIG. 7, five transactions may occur simultaneously. As shown, DML is performed by Tx1 710, DDL is performed by Tx2 720, DML is performed by Tx3 730, DML is performed by Tx4 740 and DML is performed by Tx5 750.

First, Tx1 710 may perform IX try_lock on node2, which is successful. Tx1 710 will lock node2 in IX mode. Next, Tx2 720 performs DDL and applies an X lock to node1 and then applies an X lock to node2. However, Tx2 720 will wait for Tx1 710 to apply the X lock on node2. Next, Tx1 710 may perform IX try_lock on node1. However, this will fail. Tx1 710 will then check whether the transaction has already acquired an IX lock on remote nodes. Tx1 710 will see that it has an IX lock on node2 and will skip locking node1. Thus, Tx1 710 will commit.

Next, Tx3 730 may perform IX try_lock on node1, and this will fail. However, Tx3 730 does not hold any other IX locks on remote nodes. Thus, Tx3 730 may apply an IX lock on node1, and will wait for Tx2 720.

Next, Tx4 740 may perform IX try_lock on node2 and this will fail. However, Tx4 740 does not hold any other IX locks on remote nodes. Thus, Tx4 740 may apply an IX lock on node2 and will wait for Tx2 720.

Next, Tx5 750 may perform IX try_lock on node3. This will succeed and Tx5 750 will obtain an IX lock on node3.

Next, Tx2 720 may obtain an X lock on node3. However, Tx2 720 will wait for Tx5 750. After Tx5 750 commits, then Tx2 720 will be able to apply the X lock to Tx5 750 and then commit.

Thus, according to example embodiments, there is limited network cost in most cases and there is reduced master node overhead.

Figure 8:
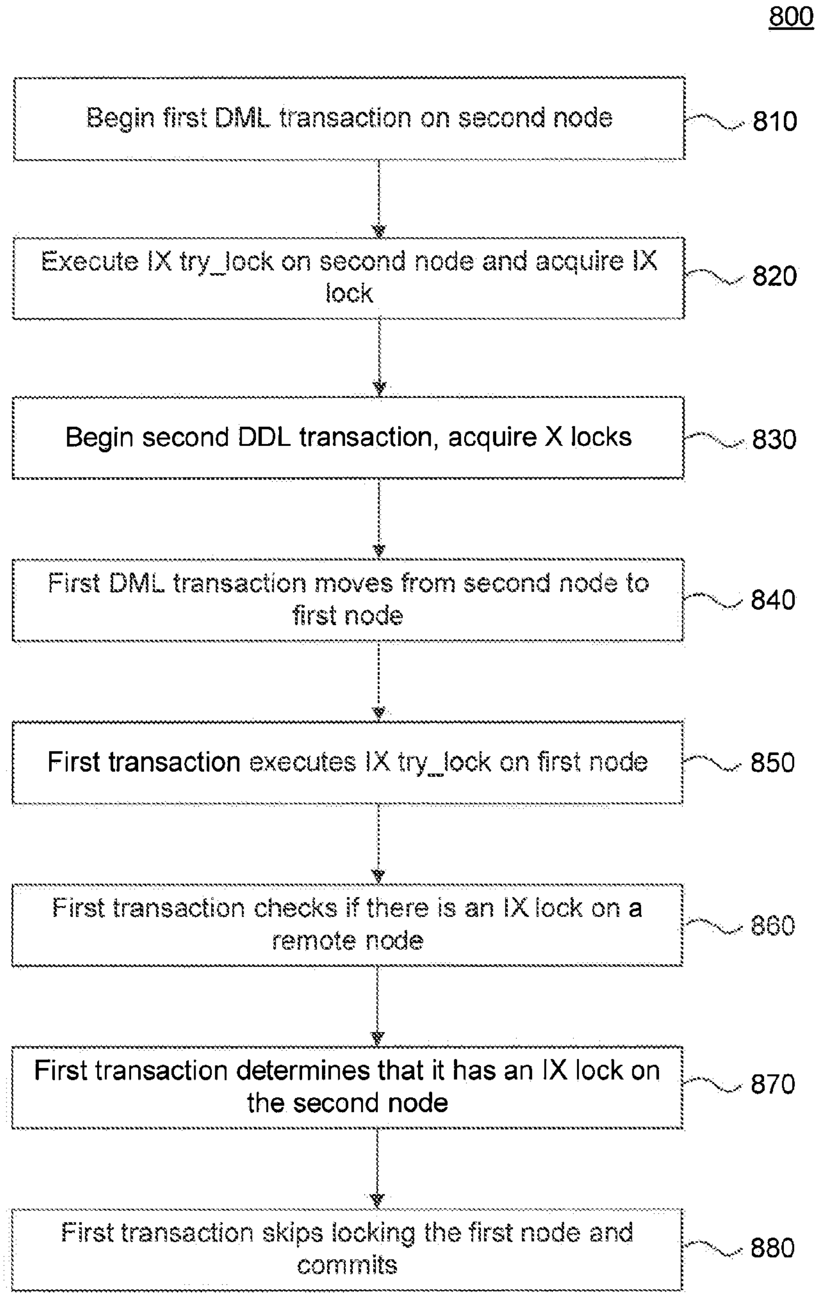
FIG. 8 illustrates a method of avoiding deadlock using an optimistic IX locking protocol according to example embodiments.

According to embodiments, FIG. 8 illustrates a method 800 of avoiding deadlock using an optimistic intentional exclusive locking protocol according to example embodiments. A multi-core parallel processing in-memory database system may execute database transactions over multiple partitions and mitigate deadlock.

As an example, two separate transactions may execute in parallel over database partitions/nodes. In step 810, a first DML transaction may begin on a second node.

In step 820, the first transaction may successfully execute IX try_lock on the second node and acquire an IX lock on the second node.

In step 830, a second DDL transaction may begin and the second transaction may acquire an X lock on a first node and acquire an X lock on the second node. However, the second transaction will have to wait for the first transaction to complete on node2.

In step 840, by applying statement routing, the first DML transaction may move from node2 to node1.

In step 850, the first transaction may execute IX try_lock on node1. However, IX try_lock will fail because of the X lock held on node1 by the second transaction.

In step 860, the first transaction may check if there is an IX lock on a remote node.

In step 870, the first transaction may determine that it has an IX lock on the second node, e.g. a remote node.

In step 880, the first transaction may skip locking on the first node and commit. Thus, according to example embodiments, deadlock does not occur.

Example Computer Implementation

Figure 9:
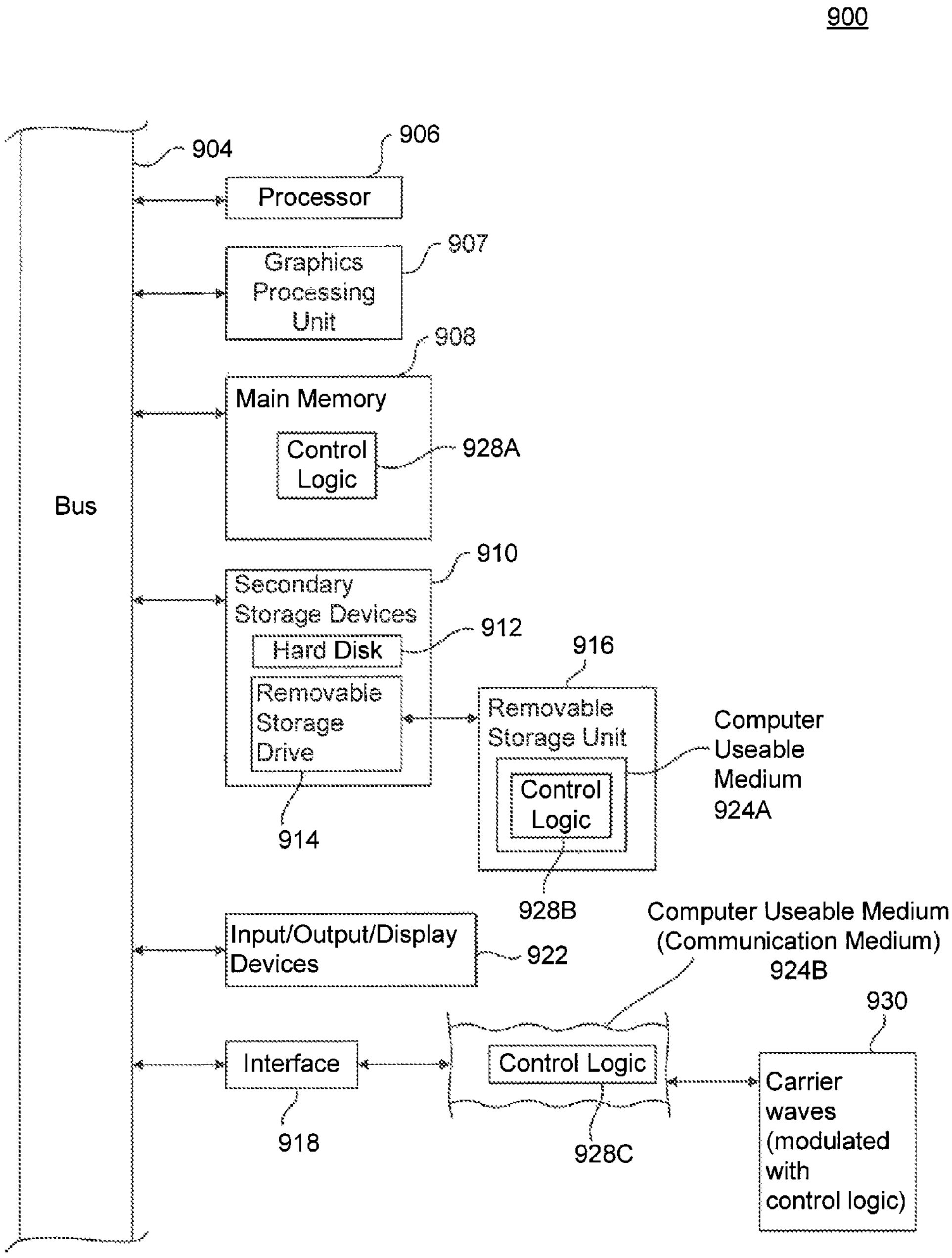
FIG. 9 illustrates an example computer system according to example embodiments.

In an example embodiment, the systems, methods and computer products described herein are implemented using well known computers, such as computer 900 shown in FIG. 9.

Computer 900 can be any commercially available and well known computer capable of performing the functions described herein, such as computers available from International Business Machines, Apple, Sun, HP, Dell, Compaq, Digital, Cray, etc.

Computer 900 includes one or more processors (also called central processing units, or CPUs), such as a processor 906. The processor 906 is connected to a communication bus 904. Processors 906 may include any conventional or special purpose processor, including, but not limited to, digital signal processor (DSP), field programmable gate array (FPGA), and application specific integrated circuit (ASIC).

Computer 900 includes one or more graphics processing units (also called GPUs), such as GPU 907. GPU 907 is a specialized processor that executes instructions and programs selected for complex graphics and mathematical operations in parallel.

Computer 900 also includes a main or primary memory 908, such as random access memory (RAM). The primary memory 908 has stored therein control logic 928A (computer software), and data.

Computer 900 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924A having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well-known manner.

Computer 900 also includes input/output/display devices 922, such as monitors, keyboards, pointing devices, touch-screen displays, etc.

Computer 900 further includes a communication or network interface 918. The network interface 918 enables the computer 900 to communicate with remote devices. For example, the network interface 918 allows computer 900 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from computer 900 via the communication medium 924B. More particularly, the computer 900 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 900, the main memory 908, the secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the disclosure.

The disclosure can work with software, hardware, and/or operating system implementations other than those described herein. Any software, hardware, and operating system implementations suitable for performing the functions described herein can be used.

Conclusion

It is to be appreciated that the Detailed Description section, and not the Summary and Abstract sections, is intended to be used to interpret the claims. The Summary and Abstract sections may set forth one or more, but not all, exemplary embodiments as contemplated by the inventors, and thus, are not intended to limit the disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the disclosure should not be limited by any of the above-described exemplary embodiments, but should be defined only in accordance with the following claims and their equivalents.

What is claimed is:

1. A method, comprising:

beginning, by at least one processor, execution of a first database transaction on a second node, acquiring a lock on the second node in intentional exclusive mode to perform operations required by the first database transaction;

beginning, by the at least one processor, a second database transaction on a first node, acquiring a lock on the first node in exclusive mode and waiting to acquire a lock on the second node in exclusive mode to perform operations required by the second database transaction;

routing, by the at least one processor, the first database transaction from the second node to the first node to perform operations required by the first database transaction;

in response to determining that the lock is acquired on the second node, determining that lock acquisition on the first node is not necessary to process the first database transaction on the first node; and committing, by the at least one processor, the first database transaction.

2. The method of claim 1, wherein the first database transaction is a data manipulation language (DML) transaction.

3. The method of claim 1, wherein the second database transaction is a data definition language (DDL) transaction.

4. The method of claim 1, further comprising:

determining that the second node is locked in intentional exclusive mode before committing the first database transaction.

5. The method of claim 1, further comprising:

executing a third database transaction on the first node and unsuccessfully trying to acquire a lock on the first node.

6. The method of claim 1, further comprising:

executing a fourth database transaction on the second node and unsuccessfully trying to acquire a lock on the second node.

7. The method of claim 1, wherein a database table is distributed into a first partition on the first node, and a second partition on the second node.

8. The method of claim 7, wherein database transactions on the first partition and the second partition may be performed in parallel.

9. The method of claim 1, further comprising:

determining that the second node is locked in exclusive mode before committing the second database transaction.

10. A system, comprising:

random access memory configured to store a database; and at least one processor configured to:

begin a first database transaction on a second node in the database, attempt to acquire and acquire a lock on the second node in intentional exclusive mode to perform operations required by the first database transaction;

begin a second database transaction on a first node in the database, acquire a lock on the first node in exclusive mode and wait to acquire a lock on the second node in exclusive mode to perform operations required by the second database transaction;

route the first database transaction from the second node to the first node and try to acquire a lock in intentional exclusive mode on the first node to perform operations required by the first database transaction;

in response to determining that the lock is acquired on the second node, determine that lock acquisition on the first node is not necessary to process the first database transaction on the first node;

and commit the first database transaction.

11. The system of claim 10, wherein the first database transaction is a data manipulation language (DML) transaction.

12. The system of claim 10, wherein the second database transaction is a data definition language (DDL) transaction.

13. The system of claim 10, the at least one processor further configured to:

determine that the second node is locked in intentional exclusive mode before committing the first database transaction.

14. The system of claim 10, the at least one processor further configured to:

execute a third database transaction on the first node and unsuccessfully try to acquire a lock on the first node.

15. The system of claim 10, the at least one processor further configured to:

execute a fourth database transaction on the second node and unsuccessfully try to acquire a lock on the second node.

16. A computer-readable device having instructions stored thereon, execution of which, by at least one computing device, causes the at least one computing device to perform operations comprising:

beginning, by at least one processor, execution of a first database transaction on a second node, acquiring a lock on the second node in intentional exclusive mode to perform operations required by the first database transaction;

beginning, by the at least one processor, a second database transaction on a first node, acquiring a lock on the first node in exclusive mode and waiting to acquire a lock on the second node in exclusive mode to perform operations required by the second database transaction;

routing, by the at least one processor, the first database transaction from the second node to the first node to perform operations required by the first database transaction;

in response to determining that the lock is acquired on the second node, determining that lock acquisition on the first node is not necessary to process the first database transaction on the first node; and committing, by the at least one processor, the first database transaction.

17. The computer-readable device of claim 16, wherein the first database transaction is a data manipulation language (DML) transaction and the second database transaction is a data definition language (DDL) transaction.

18. The computer-readable device of claim 16, the operations further comprising:

determining that the second node is locked in intentional exclusive mode before committing the first database transaction.

19. The computer-readable device of claim 16, the operations further comprising:

executing a third database transaction on the first node and unsuccessfully trying to acquire a lock on the first node.

20. The computer-readable device of claim 16, the operations further comprising:

executing a fourth database transaction on the second node and unsuccessfully trying to acquire a lock on the second node.

* * * * *